(12) United States Patent
Davis et al.

(10) Patent No.: US 11,045,784 B2
(45) Date of Patent: Jun. 29, 2021

(54) CHEMICAL ABSORBENT COMPOSITION

(71) Applicant: JOHNSON MATTHEY PUBLIC LIMITED COMPANY, London (GB)

(72) Inventors: David Jonathan Davis, Cleveland (GB); Paul Rafferty, Cleveland (GB); Elaine Margaret Vass, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 667 days.

(21) Appl. No.: 15/749,533

(22) PCT Filed: Jul. 12, 2016

(86) PCT No.: PCT/GB2016/052099
§ 371 (c)(1),
(2) Date: Feb. 1, 2018

(87) PCT Pub. No.: WO2017/021684
PCT Pub. Date: Feb. 9, 2017

(65) Prior Publication Data
US 2018/0214844 A1    Aug. 2, 2018

(30) Foreign Application Priority Data

Aug. 5, 2015 (GB) .................................. 1513836

(51) Int. Cl.
| | |
|---|---|
| *B01J 20/04* | (2006.01) |
| *B01J 20/08* | (2006.01) |
| *B01J 20/28* | (2006.01) |
| *B01J 20/30* | (2006.01) |
| *B01D 53/68* | (2006.01) |
| *B01D 53/00* | (2006.01) |
| *B01J 20/02* | (2006.01) |
| *C10G 25/00* | (2006.01) |
| *B01D 15/00* | (2006.01) |

(52) U.S. Cl.
CPC .......... *B01J 20/043* (2013.01); *B01D 53/002* (2013.01); *B01D 53/685* (2013.01); *B01J 20/0248* (2013.01); *B01J 20/0277* (2013.01); *B01J 20/08* (2013.01); *B01J 20/2803* (2013.01); *B01J 20/28004* (2013.01); *B01J 20/28016* (2013.01); *B01J 20/3007* (2013.01); *B01J 20/3028* (2013.01); *B01J 20/3042* (2013.01); *B01J 20/3078* (2013.01); *C10G 25/003* (2013.01); *B01D 15/00* (2013.01); *B01D 2251/304* (2013.01); *B01D 2251/306* (2013.01); *B01D 2251/404* (2013.01); *B01D 2251/606* (2013.01); *B01D 2252/10* (2013.01); *B01D 2253/104* (2013.01); *B01D 2253/11* (2013.01); *B01D 2253/304* (2013.01); *B01D 2256/24* (2013.01); *B01D 2257/20* (2013.01); *B01D 2257/2045* (2013.01); *B01D 2257/2064* (2013.01); *B01J 2220/42* (2013.01)

(58) Field of Classification Search
CPC .. B01J 20/043; B01J 20/0248; B01J 20/0277; B01J 20/08; B01J 20/28004; B01J 20/28016; B01J 20/2803; B01J 20/3007; B01J 20/3028; B01J 20/3042; B01J 20/3078; B01D 53/002; B01D 53/685; C10G 25/003
See application file for complete search history.

(56) References Cited

U.S. PATENT DOCUMENTS

| | | |
|---|---|---|
| 5,897,845 A | 4/1999 | Denny et al. |
| 6,558,641 B1 | 5/2003 | Bailey et al. |
| 7,790,130 B2 | 9/2010 | Kanazirev |
| 2004/0258596 A1 | 12/2004 | Hirano et al. |

FOREIGN PATENT DOCUMENTS

| | | |
|---|---|---|
| CN | 101773768 A | 7/2010 |
| DE | 102013005497 A1 | 10/2014 |
| JP | H11-262662 A1 | 9/1999 |
| JP | 2002336646 A1 | 11/2002 |
| JP | 2008540083 A1 | 11/2008 |
| WO | WO2007/061607 A2 | 5/2007 |

OTHER PUBLICATIONS

PCT/GB2016/052099, International Search Report dated Sep. 26, 2016.
PCT/GB2016/052099, Written Opinion dated Sep. 26, 2016.
GB1612053 Search Report dated Jan. 23, 2017.
GB151386, Search Report Under dated Apr. 29, 2016.

*Primary Examiner* — James A Fiorito
(74) *Attorney, Agent, or Firm* — BakerHostetler

(57) ABSTRACT

A particulate composition said composition comprises a metal carbonate and/or a metal bicarbonate and a compound of aluminium, characterised in that the weight ratio of metal carbonate plus metal bicarbonate compounds to said compound of aluminium is at least 3:1. The composition is useful for removing halogenated compounds from a hydrocarbon-containing process stream.

30 Claims, No Drawings

CHEMICAL ABSORBENT COMPOSITION

CROSS-REFERENCE TO RELATED APPLICATIONS

This application is the National Stage of International Patent Application No. PCT/GB2016/052099 filed Jul. 12, 2016, which claims priority from Great Britain Patent Application No. 1513836.5, filed Aug. 5, 2015, the disclosures of each of which are incorporated herein by reference in their entirety.

The present invention concerns absorbent compositions which may be useful for removing halide species from hydrocarbon process streams.

Absorbents for use as halide guards have been widely used for many years. U.S. Pat. No. 5,897,845 describes absorbent granules comprising an intimate mixture of particles of alumina trihydrate, 0.5 to 2 parts by weight of particles of a sodium component selected from the group consisting of sodium carbonate, sodium bicarbonate and mixtures thereof per part by weight of said alumina trihydrate and from 5 to 20% by weight of a binder, said alumina trihydrate, sodium component and binder being present in such proportions that, after ignition of a sample of the granules at 900° C., the sample has a sodium oxide, $Na_2O$, content of at least 20% by weight. Processes for manufacturing and using such absorbent granules are also described. WO2007061607 describes a composite sorbent which is the reaction product of a solid alkali metal carbonate, rehydratable alumina and water or an aqueous solution of a metal salt. The reaction between the components occurs while forming particulates followed by curing and activation at high temperatures. The composite sorbent comprises 10-25 mass % of $Na_2O$. There is a need for improved absorbent compositions which exhibit high capacity for chloride absorption and stability in use.

According to the invention we provide a particulate composition for use in removing halogenated compounds from a hydrocarbon-containing process stream, said composition comprising a metal carbonate and/or a metal bicarbonate and a compound of aluminium, characterised in that the weight ratio of metal carbonate plus metal bicarbonate compounds to said compound of aluminium is at least 3:1.

The weight ratio of metal carbonate plus metal bicarbonate compounds to the compound of aluminium may be at least 4:1. The metal carbonate and/or bicarbonate compounds are present and calculated as solid compounds. The ratio of metal carbonate/bicarbonates to aluminium compounds is particularly high compared with the prior art absorbents and is very effective in providing a high capacity for chloride. It is surprising that the relative proportion of carbonate and bicarbonate may be so high, since it would be expected that the strength of the material would prove to be too low for practical uses. We have found that the compositions provide absorbent particles which are at least as strong and resistant to attrition as some prior commercial absorbents.

By "metal carbonate" we mean a metal compound in which the anion is a carbonate ($CO_3$) anion. By "metal bicarbonate" we mean a metal compound in which the anion is a hydrogen carbonate ($HCO_3$) anion. The metal carbonate may be an alkali metal carbonate or an alkaline earth metal carbonate, in particular potassium carbonate, calcium carbonate or sodium carbonate ($Na_2CO_3$), including hydrated forms such as sodium carbonate decahydrate, heptahydrate and monohydrate. Highly hydrated sodium carbonate tends to have a significantly lower melting point than monohydrate or anhydrous sodium carbonate and therefore these less hydrated forms may be preferred because they are easier to handle. The metal bicarbonate may be an alkali metal bicarbonate or an alkaline earth metal bicarbonate, in particular potassium bicarbonate or sodium bicarbonate ($NaHCO_3$). The composition may contain a mixture of a metal bicarbonate and a metal carbonate. When the composition comprises both sodium carbonate and sodium bicarbonate, the sodium compounds may be present in the form of sodium sesquicarbonate, which is a natural material containing approximately equal amounts of carbonate and bicarbonate. Other forms of carbonate and bicarbonate materials may be used, including other naturally occurring materials and hydroxycarbonate materials. The amount of metal carbonate in the total amount of metal carbonate plus metal bicarbonate may be 0-75% by weight. In certain embodiments of the invention, the amount of metal carbonate in the total amount of metal carbonate plus metal bicarbonate may be 30-60% by weight. The composition, after ignition of a sample at 900° C., may have a sodium oxide, $Na_2O$, content of at least 20% by weight, and may be at least 25% by weight, especially at least 30% by weight.

The compound of aluminium is preferably an oxide or hydroxide of aluminium, such as an alumina, including a transition alumina, or a hydrated alumina. The compound of aluminium may be hydrated alumina, for example alumina trihydrate ($Al(OH)_3$) or $Al_2O_3.3H_2O$ or aluminium oxide-hydroxide ($AlO(OH)$) or $Al_2O_3.H_2O$. Hydrated alumina is available in different forms, for example boehmite, Gibbsite, hydrargillite, bayerite, and known by different nomenclatures such as $\gamma$-AlO(OH), $\alpha$-Al(OH)$_3$, $\beta$-Al(OH)$_3$ and $\gamma$-Al(OH)$_3$. Optionally a transition form of alumina may be present. Transition aluminas are formed by the partial dehydration of alumina trihydrate or boehmite; different transition aluminas being formed at different stages of dehydration.

The composition may further comprise a binder. Suitable binders include clay materials, for example sepiolite or attapulgite, and cements such as calcium aluminate cement. The amount of binder in the composition, if present, may be such as to give a weight ratio of aluminium compound to binder of 0.5-2:1.

As an example of the composition of the invention, we have found that a composition comprising about 75% wt sodium bicarbonate, 12.5% wt alumina trihydrate and 12.5% wt of attapulgite clay provides a high capacity for chloride removal. Such a composition has a sodium oxide content of at least 45% wt by weight after ignition of a sample at 900° C.

As a further example of the composition of the invention, we have found that a composition comprising about 50% wt sodium bicarbonate, about 25% wt sodium carbonate, about 16.7% wt alumina trihydrate and about 8.3% wt of attapulgite clay provides a high capacity for chloride removal.

The absorbent composition preferably has a surface area, as measured by B.E.T. methods, of at least 5 $m^2g^{-1}$, more preferably at least 10 $m^2g^{-1}$.

The composition is preferably provided in the form of particles having an average size (diameter or equivalent dimension) of at least 0.2 mm, preferably 0.8 mm, more preferably at least 1 mm. The particle size range is preferably 0.2 mm to 10 mm, more preferably 2 to 5 mm. The particles typically have a minimum dimension which is <10 mm, particularly <5 mm. The particle size may be determined using conventional methods. The particles may be in the form of granules, agglomerates, spheres, cylinders, rings, saddles or another shape. The particles may be formed by granulation, tabletting or extrusion. When we refer to a particulate absorbent composition, we mean that the particles of absorbent include all of the ingredients of the composition, and not that particles of each of the ingredients is used separately.

In one embodiment, the ingredients of the composition, i.e. the solid metal carbonate and/or metal bicarbonate compounds, the compound of aluminium and the binder, if present, are mixed together in the presence of a liquid such as water to form granules. The granules are then dried at a temperature which is less than 120° C., usually in the range 25-90° C., especially 30-65° C. The dried granules may be classified, e.g. by sieving, to remove fines and over-sized particles. The dried particles may be subjected to a heat treatment, or calcination. Such calcination may decompose the metal carbonate or metal bicarbonate to form the oxide. If this step is carried out, the calcination temperature is usually less than 600° C., for example 300-550° C.

The absorbent composition is useful for removing halogenated compounds from a hydrocarbon-containing process stream. The halogenated compounds may be organic halides such as alkyl-halides (RCl, where R is a hydrocarbon), or inorganic halides such as hydrogen chloride, HCl. In particular the absorbent may be used for the removal or organic chlorides and/or HCl. The removal of organic halides and/or inorganic halides from hydrocarbons is practiced in particular in petroleum refineries. Therefore a preferred hydrocarbon stream is a refinery process stream. The hydrocarbon stream may be in the liquid or the gas phase.

The invention will be further described in the following examples.

EXAMPLE 1

Granules of a composition according to the invention were prepared by mixing powders of sodium bicarbonate, alumina trihydrate (gibbsite) and a binder (attapulgite clay) in the weight ratio 6:1:1. The powders were formed into granules using a planetary (Hobart) mixer by adding water. The resulting granular material was dried in air in an oven at 25° C. (or at 90° C. see Table 1). The granules were then sieved to a size fraction of 2-4.8 mm and tested for chloride capacity as described in Example 4 below.

EXAMPLE 2

Granules of a composition according to the invention were prepared by mixing powders of sodium bicarbonate, sodium carbonate, alumina trihydrate (gibbsite) and a binder (attapulgite clay) in the weight ratio 6:3:2:1. The powders were formed into granules using a planetary (Hobart) mixer by adding water. The resulting granular material was dried in air in an oven at 30° C. (or at 90° C. see Table 1). The granules were then sieved to a size fraction of 2.8-4.8 mm and tested for chloride capacity as described in Example 4 below.

EXAMPLE 3 (COMPARATIVE)

Granules of a composition according to the invention were prepared by mixing powders of sodium bicarbonate, alumina trihydrate and a binder in the ratio 55:45:11. The powders were formed into granules using a Hobart mixer and adding water. The resulting granular material was dried in air in an oven at 25° C. (or at 90° C. see Table 1). The granules were then sieved to a size fraction of 2-4.8 mm and tested for chloride capacity as described in Example 4 below.

EXAMPLE 4: CHLORIDE SATURATION TEST 10 ml samples of each of the absorbent granules made in Examples 1 and 2 were tested separately for HCl absorption characteristics by passing hydrogen containing 1% HCl by volume at atmospheric pressure and about 20° C. for 22 hours through the sample. The gas flow rate was set to 45 litres/hour, giving a GHSV of 4,500 $hr^{-1}$. The samples are then ground up and tested for chloride content using a commercially available chloride analyser (Sherwood Scientific Ltd). Prior to analysis the ground samples are reacted in nitric acid/water mixture to prevent the formation of Ag salts which would otherwise interfere with the chloride analysis.

TABLE 1

| Sample | Drying T (° C.) | $Cl^-$ (%) |
|---|---|---|
| Example 1 | 25 | 40.4 |
| Example 1 | 90 | 28.3 |
| Example 2 | 30 | 39.1 |
| Example 2 | 90 | 33.6 |
| Example 3 (comp) | 25 | 26.3 |
| Example 3 (comp) | 90 | 12.7 |

The invention claimed is:

1. A particulate composition for removing halogenated compounds from a hydrocarbon-containing process stream, said composition comprising an alkali metal carbonate or an alkaline earth metal carbonate and an alkali metal bicarbonate or an alkaline earth metal bicarbonate and a hydrated alumina,
    wherein the weight ratio of alkali metal carbonate or alkaline earth metal carbonate plus the alkali metal bicarbonate or alkaline earth metal bicarbonate compounds to said hydrated alumina is at least 3:1, and the amount of the alkali metal carbonate or alkaline earth metal carbonate in the total amount of alkali metal carbonate or alkaline earth metal carbonate plus alkali metal bicarbonate or alkaline earth metal bicarbonate is 20-75% by weight.

2. The particulate composition of claim 1, wherein the weight ratio of the alkali metal carbonate or alkaline earth metal carbonate plus the alkali metal bicarbonate or alkaline earth metal bicarbonate compounds to said hydrated alumina is at least 4:1.

3. The particulate composition of claim 1, wherein the alkali metal carbonate or alkaline earth metal carbonate is present as potassium carbonate, calcium carbonate or sodium carbonate.

4. The particulate composition of claim 1, wherein the alkali metal bicarbonate or alkaline earth metal bicarbonate is potassium bicarbonate or sodium bicarbonate.

5. The particulate composition of claim 1, wherein the composition contains a mixture of the alkali metal carbonate or alkaline earth metal bicarbonate and the alkali metal bicarbonate or alkaline earth metal carbonate.

6. The particulate composition of claim 1, wherein the amount of the alkali metal carbonate or an alkaline earth metal carbonate in the total amount of the alkali metal carbonate or alkaline earth metal carbonate plus the alkali metal bicarbonate or alkaline earth metal bicarbonate is 20-60% by weight.

7. The particulate composition of claim 1 that consists of the alkali metal bicarbonate or alkaline earth metal bicarbonate, the hydrated alumina, a binder, and the alkali metal carbonate or alkaline earth metal carbonate.

8. A method of forming a particulate composition of claim 1 comprising the steps of mixing together
   a. the alkali metal bicarbonate or alkaline earth metal bicarbonate and the alkali metal carbonate or alkaline earth metal carbonate compounds,
   b. the hydrated alumina and
   c. optionally a binder,
   in the presence of water and forming the mixture into particles.

9. The method of claim 8, further comprising the step of drying the formed particles at a temperature of less than 120° C.

10. The method of claim 9, wherein the drying is carried out a temperature in the range of from 25° C. to 90° C.

11. The method of claim 8, wherein the mixture is formed into particles by granulation, tabletting or extrusion.

12. The method of claim 8, wherein the particles have an average size (diameter or equivalent dimension) of at least 0.2 mm.

13. A process for removing halogenated compounds from a hydrocarbon-containing process stream using a particulate composition of claim 1.

14. The method of claim 8, wherein the particles have an average size (diameter or equivalent dimension) of at least 0.8 mm.

15. The method of claim 8, wherein the particles have an average size (diameter or equivalent dimension) of at least 1 mm.

16. The particulate composition of claim 1, wherein the hydrated alumina is an alumina trihydrate ($Al(OH)_3$) or aluminum oxide-hydroxide ($AlO(OH)$).

17. The particulate composition of claim 1, wherein the amount of the alkali metal carbonate or alkaline earth metal carbonate in the total amount of the alkali metal carbonate or alkaline earth metal carbonate plus the alkali metal bicarbonate or alkaline earth metal bicarbonate is 30-60% by weight.

18. The particulate composition of claim 1 that consists of the alkali metal carbonate or alkaline earth metal carbonate, the alkali metal bicarbonate or alkaline earth metal bicarbonate, the hydrated alumina and, a binder,
   wherein the weight ratio of the alkali metal carbonate or alkaline earth metal carbonate plus the alkali metal bicarbonate or alkaline earth metal bicarbonate compounds to said hydrated alumina is at least 3:1, and
   the amount of alkali metal carbonate or alkaline earth metal carbonate in the total amount of alkali metal carbonate or alkaline earth metal carbonate plus alkali metal bicarbonate or alkaline earth metal bicarbonate carbonate is 20-75% by weight.

19. The particulate composition of claim 1 that consists of the alkali metal bicarbonate or alkaline earth metal bicarbonate, the hydrated alumina, and a binder, wherein the weight ratio of the alkali metal bicarbonate or alkaline earth metal bicarbonate to said hydrated alumina is at least 3:1.

20. The particulate composition of claim 7, wherein the binder is a clay material or a cement.

21. The particulate composition of claim 20, wherein the clay material is sepiolite or attapulgite and the cement is a calcium aluminate cement.

22. The particulate composition of claim 7, wherein the amount of binder in the composition is such as to give a weight ratio of hydrated alumina to binder in a range of from 0.5:1 to 2:1.

23. The particulate composition of claim 7, comprising about 50% wt sodium bicarbonate, about 25% wt sodium carbonate, about 16.7 wt % alumina trihydrate and about 8.3 wt % of attapulgite clay.

24. The particulate composition of claim 7 having a surface area, as measured by B.E.T. methods, of at least 5 $m^2g^{-1}$.

25. The particulate composition of claim 7 having a surface area, as measured by B.E.T. methods, of at least 10 $m^2g^{-1}$.

26. The particulate composition of claim 7 whose particles have an average size (diameter or equivalent dimension) of at least 0.2 mm.

27. The particulate composition of claim 7, in which the particle size range is from is 0.2 mm to 10 mm.

28. The particulate composition of claim 7 whose particles have an average size (diameter or equivalent dimension) of at least 1 mm and are present in a range of from 2 mm to 5 mm.

29. The particulate composition of claim 1, wherein the hydrated alumina is an alumina trihydrate ($Al(OH)_3$).

30. The particulate composition of claim 1, wherein the hydrated alumina is an aluminum oxide-hydroxide ($AlO(OH)$).

* * * * *